United States Patent [19]

Blackmore

[11] 4,002,370
[45] Jan. 11, 1977

[54] VALVE ASSEMBLY FOR EXHAUST SYSTEM
[75] Inventor: Donald F. Blackmore, Wadsworth, Ohio
[73] Assignee: General Motors Corporation, Detroit, Mich.
[22] Filed: Mar. 11, 1976
[21] Appl. No.: 665,801
[52] U.S. Cl. .............................. 298/1 H; 137/610; 137/625.5
[51] Int. Cl.[2] .......................................... B60P 1/00
[58] Field of Search ............ 298/1 H; 137/609, 610, 137/612.1, 625.5

[56] References Cited
UNITED STATES PATENTS

| | | | |
|---|---|---|---|
| 3,731,973 | 5/1973 | Kermode | 137/625.25 X |
| 3,779,280 | 12/1973 | Evans | 137/625.5 |

Primary Examiner—Robert J. Spar
Assistant Examiner—George F. Abraham
Attorney, Agent, or Firm—Edward J. Biskup

[57] ABSTRACT

A valve assembly for an exhaust system of a dump vehicle having a chassis supporting an operator's cab and a pivoted material-handling body. The valve assembly is carried by the chassis and adapted to direct exhaust gases upwardly into the hollow interior of the body when the latter is in a lowered load-retaining position and is adapted to direct exhaust gases toward the ground when the body is in a raised dumping position.

3 Claims, 6 Drawing Figures

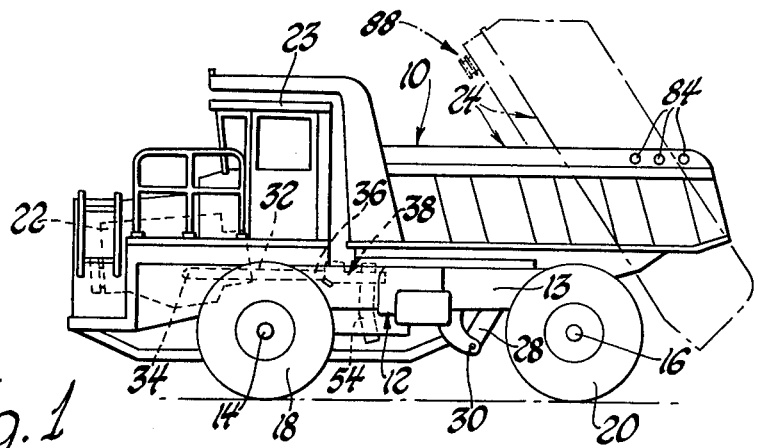
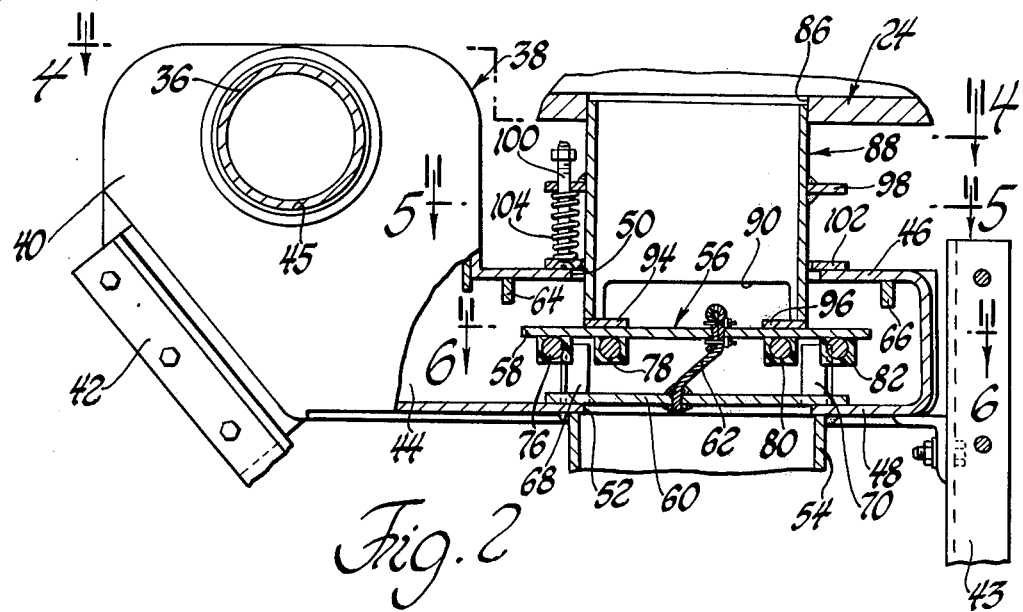
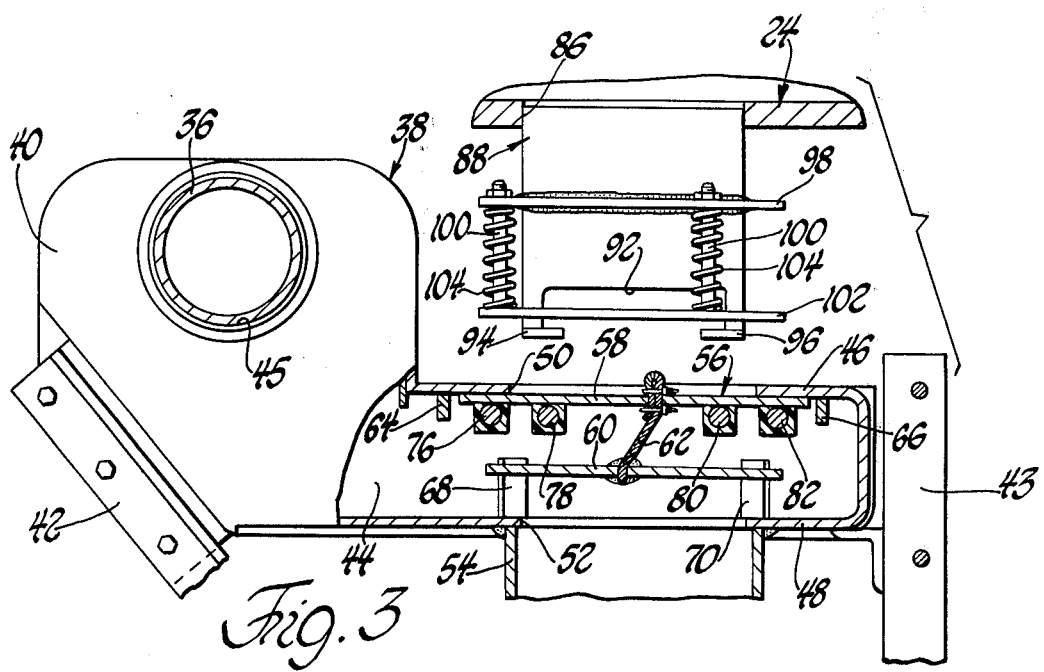

VALVE ASSEMBLY FOR EXHAUST SYSTEM

The present invention concerns a valve assembly which is to be incorporated with the exhaust system of a dump truck for directing exhaust gases into the dump body when the latter is in the lowered position so as to heat the body and prevent the material therein from sticking to the side walls during cold weather operation. When the body is raised for dumping the load, the valve assembly serves to close the outlet opening leading to the body structure and divert the gases toward the ground.

In the preferred form, the valve assembly made according to the invention comprises a housing having an inlet opening that is connected with the engine for receiving exhaust gases therefrom. The housing also has a pair of axially aligned outlet openings, one of which serves to connect the exhaust gases with the hollow interior of the dump body, while the other directs the exhaust gases toward the ground. A closure member comprising vertically spaced upper and lower plate members interconnected by a flexible member is located in the housing. Means formed with the housing are provided for guiding the plate members for movement between the outlet openings along a vertical axis so as to alternately open and close the outlet openings depending upon the position of the dump body. A first magnetic holding means serves to maintain the upper plate member in a raised position to close the outlet opening to the dump body when the latter is in the raised dumping position, while at the same time causing the lower plate member to be held by the cable in a raised position so as to open the other outlet opening. A conduit is provided on the bottom of the dump body and is adapted to extend through the outlet opening to the body when the latter is in the lowered position. As a result, the free end of the conduit contacts the upper plate member and causes the latter to be moved downwardly against the influence of the first holding means and thereby connects the interior of the housing with the hollow interior of the dump body while permitting the lower plate member to be lowered to close the other outlet opening. At the same time, a second magnetic holding means maintain the upper plate member in engagement with the lower end of the conduit.

The objects of the present invention are to provide a new and improved valve assembly which directs the exhaust gases of an internal combustion engine into the hollow body structure of a dump body when the latter is in a lowered position and directs the gases toward the ground when the body is in a raised position; to provide a new and improved valve assembly which causes exhaust gases to flow through one of two openings which are adapted to be opened and closed by a pair of vertically spaced horizontally oriented plate members which are guided for reciprocal movement along a vertical axis; to provide a new and improved exhaust diverter system for a dump truck that has a conduit projecting from the bottom of the dump body that is adapted to directly contact and release one part of a closure member of a valve assembly when the dump body is in a lowered position so that the other part of the closure member will move downwardly to close a lower opening and thereby permit the exhaust gases to be directed into the hollow interior of the dump body; to provide a new and improved exhaust diverter system for a dump truck that includes a valve assembly having releasable holding means for maintaining one part of a closure member in a raised position to close an upper outlet opening when the dump body is raised while causing another part of the closure member to open a lower opening so that exhaust gases can flow towards the ground; and to provide a new and improved valve assembly which controls the flow of exhaust gases through two outlet openings and employs a closure member that is maintained in two positions by magnetic holding means.

Other objects and advantages of the present invention will be apparent from the following detailed description when taken with the drawings in which:

FIG. 1 is a side elevation view of a dump truck incorporating a valve assembly made in accordance with the invention;

FIG. 2 is an enlarged elevational view of the valve assembly incorporated with the dump truck of FIG. 1 and shows the relative positions of the various parts of the valve assembly when the dump body is in a lowered load-retaining position;

Figure 4:
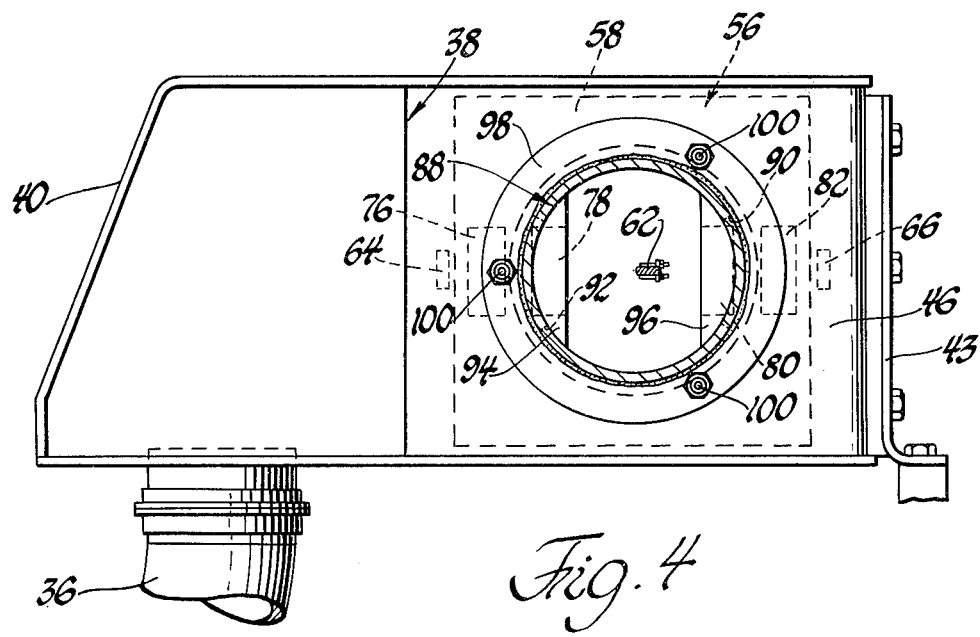
Figure 5:
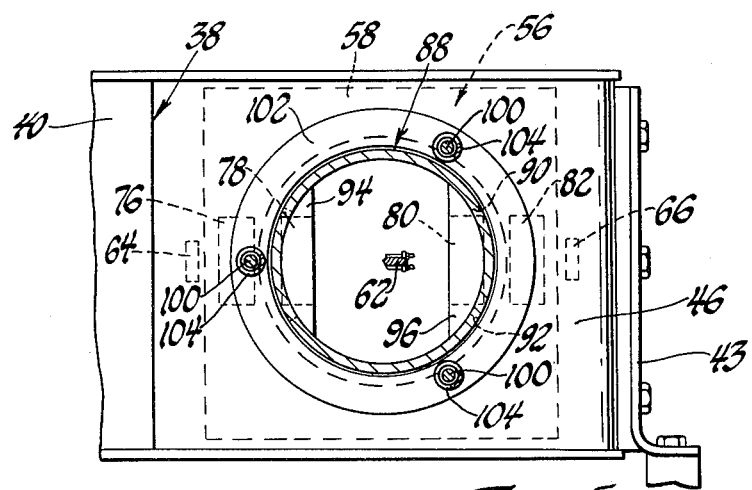
Figure 6:
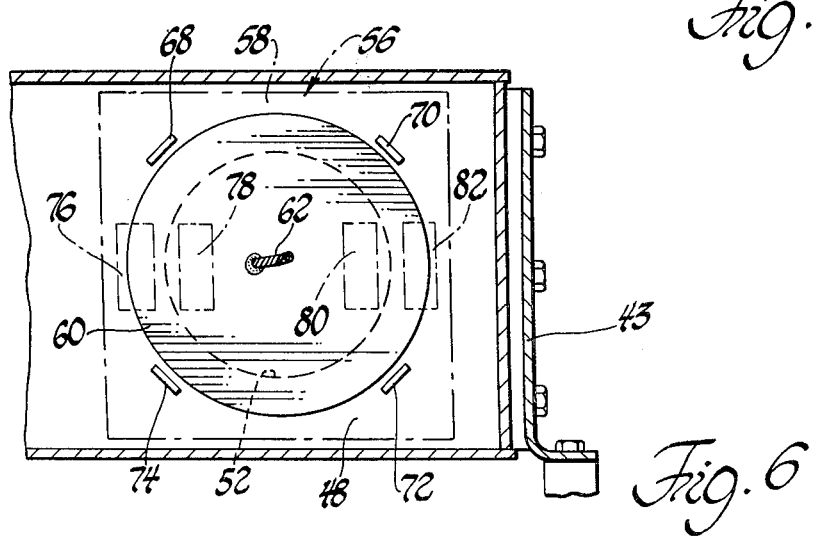

FIG. 3 is a view similar to FIG. 2 but shows the relative positions of the parts of the valve assembly when the dump body is in a raised position; and FIGS. 4, 5 and 6 are views taken on lines 4—4, 5—5 and 6—6 respectively of FIG. 2.

Referring to the drawings and more particularly FIG. 1 thereof, an off-highway rear dump truck 10 is shown having a chassis 12 comprising a frame 13 that is mounted on longitudinally spaced front and rear axles 14 and 16 which respectively support wheels 18 and 20. The front end of the chassis 12 is provided with an internal combustion engine 22 which provides drive to the rear wheels 20 through a suitable gear train (not shown). An operator's cab 23 is supported by the front end of the chassis 12 adjacent the engine 22 and, as is conventional, includes a steering wheel and controls (not shown) for operating the vehicle. In addition, the chassis 12 supports a load-retaining container or dump body 24, the rear lower portion of which is connected by a pivotal connection to the rear end of the frame 13. As shown in full lines, the dump body 24 is in the lowered load-retaining position and is movable to the raised dumping position shown in phantom lines through a multistage hydraulic cylinder 28, the lower end of which is connected to the frame 13 by a pivotal connection 30.

During cold weather operation of rear dump trucks of the type described above, it has been found that the moisture in the material will cause the latter to freeze to the bottom and side walls of the dump body. As a result, the dump body will frequently retain part of the load at all times resulting in inefficient use of the load-carrying capacity of the body. In order to alleviate this problem, it has been customary to have the trucks equipped with a body heating system in which the hot exhaust gases from the engine flow into the body structure of the dump body to heat the latter and thereby prevent the material from adhering thereto. In this regard, it will be noted that the rear dump truck 10 shown in FIG. 1 incorporates a body heating system of the type referred to above. The body heating system includes an exhaust pipe 32, the front end 34 of which is connected to the engine 22, while the rear end 36 is connected to a valve assembly 38 which is made according to the invention and serves to direct the exhaust gases into the hollow interior of the dump body 24 when the latter is in the lowered position of FIG. 1 and divert the exhaust gases toward the ground when the dump body 24 is in the raised dumping position.

As seen in FIG. 2, the valve assembly 38 comprises a housing 40 which is connected by support brackets 42 and 43 to the upper portion of frame 13 at spaced points located intermediate the front and rear axles 14 and 16. The housing 40 has a completely enclosed chamber 44 which receives exhaust gases from the engine 22 via the exhaust pipe 32 which is connected to the housing at an inlet opening or port 45. The housing 40 includes a pair of vertically spaced walls 46 and 48 located in horizontal planes and provided with axially aligned circular outlet openings 50 and 52, respectively. The opening 52 serves to communicate the chamber 44 with a downwardly extending cylindrical pipe 54 which is rigidly connected at its upper end to the wall 48 and serves to direct exhaust gases toward the ground.

A closure member 56 is located within housing 40 for movement along a vertical axis between the lowered position shown in FIG. 2, wherein the closure member 56 blocks the flow of gases from the chamber 44 into the pipe 54 but permits flow into the body 24, and the raised position shown in FIG. 3, wherein the closure member 56 closes the opening 50 but allows gas flow through the pipe 54. In this regard, it will be noted that the closure member 56 comprises a rectangular upper plate member 58 and a circular lower plate member 60 both of which are interconnected by a flexible cable 62. Each end of the cable 62 is connected to the associated plate member at a point slightly off center so as to allow bending of the cable and thereby provide a lost motion connection between the plate members. Also, the upper plate member 58 is guided during its movement from the lowered position of FIG. 2 to the raised position of FIG. 3 by a pair of guide plates 64 and 66 secured to wall 46 and also by the side walls of the housing. Similarly, the lower plate member 60 is guided during movement between the latter mentioned positions by guide plates 68, 70, 72, and 74 secured to the wall 48. In addition, the upper plate member 58 has four magnets 76, 78, 80, and 82 fixedly attached to the lower surface thereof which serves as holding means in a manner to be explained hereinafter. It will be noted that the magnets 76 and 82 are positioned on the plate member 58 so as to be vertically aligned with a portion of the wall 46 while the magnets 78 and 80 are positioned so that they are vertically aligned with the opening 50. The reason for this arrangement of the magnets will become more apparent as the description of the invention proceeds.

When the body 24 is in the phantom line position of FIG. 1, the closure member 56 is located in the raised position of FIG. 3 to cause the upper plate member 58 to close the outlet opening 50 in the wall 46 and at the same time cause engine exhaust gas to flow into pipe 54. To realize the latter, the magnets 76 and 82 cause the upper plate member 58 to be held to the wall 46 and the cable 62 supports the lower plate member 60 above the outlet opening 52. Thus, the outlet opening 52 is open relative to chamber 44 permitting the exhaust gas to flow through pipe 54 towards the ground.

Although not shown, the body structure of the dump body 24 is essentially hollow in that it is provided with passages which are located in the side walls and also in the floor portion of the body. In addition, suitable baffles are provided in the body passages for directing exhaust gases in a manner whereby heating of substantially the entire body structure occurs after which the gases are exhausted through ports 84 located at the rear of the dump body 24. In this case, the passages within the dump body 24 are connected to a port 86 formed in the floor portion as seen in FIG. 2. The port 86 rigidly supports a cylindrical conduit 88 having an outer diameter that is less than the diameter of the opening 50. The lower end of the conduit 88 is provided with a pair of diametrically opposed cutout portions 90 and 92 and also terminates with a pair of opposed generally crescent shaped horizontal contact members 94 and 96 which are secured to the end of the conduit 88. An upper ring 98 is secured to the outer diameter of the conduit 88 and is adapted to slidably support three equally circumferentially spaced bolts 100, the head end of each of which is rigidly secured to a lower ring 102. A coil spring 104 is wound around the shank of each bolt 100 and normally biases the ring 102 downwardly as seen in FIG. 3.

It will be noted that the port 86 and accordingly the conduit 88 is located in a position on the dump body 24 so that when the latter is in the lowered load-retaining position shown in FIGS. 1 and 2, the center longitudinal axis of the conduit 88 is coaxial with the center of the openings 50 and 52. As a result, when the body 24 is lowered from the phantom line position to the full line position, the conduit 88 registers with and extends through the opening 50 to cause the contact members 94 and 96 to contact the upper surface of plate 58 and cause magnets 76 and 82 to release the plate 58 from a holding engagement with the wall 46 and at the same time cause the magnets 78 and 80 and accordingly the plate member 58 to be attracted to the contact members 94 and 96 and held thereto. As the plate member 58 moves downwardly, the lower plate member 60 is guided by the upstanding guide plates 68–74 to the lowered position of FIG. 2 to close the outlet opening 52. As alluded to hereinbefore, the cable 62 serves as a lost motion connection during this time. In addition, it can be seen that after the conduit 88 moves into the housing 40 a predetermined distance, the ring 102 contacts the upper surface of the wall 46 and serves to diminish the size of the opening 50 and thereby helps prevent exhaust gases from escaping into the atmosphere through the opening between the outer diameter of the conduit 88 and the opening 50. At the same time, the chamber 44 in the housing 40 is fluidly connected with the conduit 88 through the cutout portions 90 and 92 formed therein, while the opening 52 in the wall 48 is closed by the lower plate member 60 so that the exhaust gases can only flow through the conduit 88 into the body structure of the dump body 24. It should be apparent that when the dump body 24 is moved to the raised-dumping position of FIG. 1, the conduit 88 is retracted from the opening 50 so as to simultaneously break the magnetic connection with the upper plate member 58 while permitting the latter to assume the position of FIG. 3 wherein the magnets 76 and 82 hold plate member 58 to the wall 46. The upward movement of the plate member 58 causes the plate member 60 to raise and uncover the opening 52 so as to connect the chamber 44 with the pipe 54 as explained above.

Various changes and modifications can be made in this construction without departing from the spirit of the invention. Such changes and modifications are contemplated by the inventor and he does not wish to be limited except by the scope of the appended claims.

The embodiments of the invention in which an exclusive property or privilege is claimed are defined as follows:

1. A valve assembly for a vehicle having a chassis supporting an operator's cab and a pivoted material-handling container having a hollow body structure, the valve assembly adapted to direct exhaust gases upwardly into said hollow body structure when the material-handling container is in a lowered load-retaining position and adapted to direct the exhaust gases downwardly toward the ground when the material-handling container is in a raised dumping position, said valve assembly comprising a housing having a first outlet opening and a second outlet opening formed therein, a closure member comprising spaced upper and lower plate members, a flexible member interconnecting said plate members, said closure member adapted to move between a first position wherein said upper plate member closes the first outlet opening and said lower plate member opens the second outlet opening and a second position wherein said lower plate member closes the second outlet opening and said upper plate member opens the first outlet opening, first and second holding means, said first holding means serving to maintain said closure member in said first position when the material-handling container is in the raised dumping position, a conduit secured to and projecting downwardly from said material-handling container and communicating with said hollow body structure, said conduit extending into said first outlet opening when the material-handling container is in the lowered load-retaining position so as to directly contact the upper plate member and cause the latter to be moved into the second position against the influence of the first holding means while the second holding means causes the upper plate member to be held by the conduit.

2. A valve assembly for a vehicle having a chassis supporting an operator's cab and a pivoted material-handling container having a hollow body structure, the valve assembly adapted to direct exhaust gases upwardly into said hollow body structure when the material-handling container is in a lowered load-retaining position and adapted to direct the exhaust gases downwardly toward the ground when the material-handling container is in a raised dumping position, said valve assembly comprising a housing having a first outlet opening and a second outlet opening formed therein, a closure member comprising vertically spaced upper and lower plate members, a flexible member interconnecting said plate members, means for guiding said closure member in said housing for movement between a first position wherein said upper plate member closes the first outlet opening and said lower plate member opens the second outlet opening and a second position wherein said lower plate member closes the second outlet opening and said upper plate member opens the first outlet opening, first and second holding means, said first holding means serving to maintain said closure member in said first position when the material-handling container is in the raised dumping position, a conduit secured to and projecting downwardly from said material-handling container and communicating with said hollow body structure, said conduit extending into said first outlet opening when the material-handling container is in the lowered load-retaining position so as to directly contact the upper plate member and cause the latter to be moved into the second position against the influence of the first holding means while the second holding means causes the upper plate member to be held by the conduit.

3. A valve assembly for a vehicle having a chassis supporting an operator's cab and a pivoted material-handling container having a hollow body structure, the valve assembly adapted to direct exhaust gases upwardly into said hollow body structure when the material-handling container is in a lowered load-retaining position and adapted to direct the exhaust gases downwardly toward the ground when the material-handling container is in a raised dumping position, said valve assembly comprising a housing having an upper wall provided with a first outlet opening and a lower wall provided with a second outlet opening, a closure member comprising vertically spaced horizontally oriented upper and lower plate members, a cable interconnecting said plate members, a plurality of vertically positioned guide plates secured to said upper and lower walls for guiding said closure member in said housing for movement between a first position wherein said upper plate member closes the first outlet opening and said lower plate member opens the second outlet opening and a second position wherein said lower plate member closes the second outlet opening and said upper plate member opens the first outlet opening, first and second magnetic means carried by said upper plate member, said first magnetic means being vertically aligned with a portion of the upper wall and serving to maintain said closure member in said first position when the material-handling container is in the raised dumping position, said second magnetic means being vertically aligned with said first outlet opening, a conduit secured to and projecting downwardly from said material-handling container and communicating with said hollow body structure, said conduit extending into said first outlet opening when the material-handling container is in the lowered load-retaining position so as to directly contact the upper plate member and cause the latter to be moved into the second position against the influence of the first magnetic means while the second magnetic means causes the upper plate member to be held by the conduit.

* * * * *